US012579372B2

(12) United States Patent (10) Patent No.: US 12,579,372 B2
Jain et al. (45) Date of Patent: Mar. 17, 2026

(54) KEY PHRASE TOPIC ASSIGNMENT

(71) Applicant: Capital One Services, LLC, McLean, VA (US)

(72) Inventors: Deepali Jain, Bangalore (IN); Shaktimaan Singh Sengar, Bengaluru (IN)

(73) Assignee: Capital One Services, LLC, McLean, VA (US)

( * ) Notice: Subject to any disclaimer, the term of this patent is extended or adjusted under 35 U.S.C. 154(b) by 252 days.

(21) Appl. No.: 18/489,671

(22) Filed: Oct. 18, 2023

(65) Prior Publication Data

US 2025/0131199 A1 Apr. 24, 2025

(51) Int. Cl.
*G06F 40/35* (2020.01)
*G06F 40/289* (2020.01)

(52) U.S. Cl.
CPC ............ *G06F 40/35* (2020.01); *G06F 40/289* (2020.01)

(58) Field of Classification Search
None
See application file for complete search history.

(56) References Cited

U.S. PATENT DOCUMENTS

| | | | | |
|---|---|---|---|---|
| 6,104,989 A * | 8/2000 | Kanevsky | ............. | G06F 40/216 704/7 |
| 11,849,069 B1 * | 12/2023 | Can | ..................... | H04M 3/5175 |
| 11,995,133 B1 * | 5/2024 | McClusky | ............ | G06F 16/338 |
| 2015/0332168 A1 * | 11/2015 | Bhagwat | ............... | G06F 3/0481 706/12 |
| 2020/0081975 A1 * | 3/2020 | Yadav | ................... | G06F 16/355 |
| 2020/0175397 A1 * | 6/2020 | Wang | ................... | G06F 16/285 |
| 2021/0118432 A1 * | 4/2021 | McCourt | ................ | G10L 15/22 |
| 2022/0222695 A1 * | 7/2022 | Shome | ............. | G06F 16/24575 |
| 2022/0335220 A1 * | 10/2022 | Korada | .................. | G06N 20/10 |
| 2024/0098055 A1 * | 3/2024 | Murdock, IV | .......... | G06F 40/40 |
| 2024/0144916 A1 * | 5/2024 | Britt | ...................... | G10L 15/063 |
| 2024/0211687 A1 * | 6/2024 | Saeedi | ................. | G06F 40/274 |

* cited by examiner

*Primary Examiner* — Douglas Godbold
(74) *Attorney, Agent, or Firm* — Harrity & Harrity, LLP

(57) ABSTRACT

In some implementations, a system may obtain a transcript that includes interactions between a user and an entity. The system may extract a first quantity of key phrases from a first portion of the transcript that corresponds to an entirety of the transcript and may extract a second quantity of key phrases from a second portion of the transcript that corresponds to a subset of the entirety of the transcript. The system may assign one or more key phrases to one or more topics, and may calculate a topic frequency that indicates a total quantity of key phrases associated with the topic. The system may generate a third set of topics that includes one or more topics having a topic frequency that satisfies a topic frequency threshold.

20 Claims, 6 Drawing Sheets

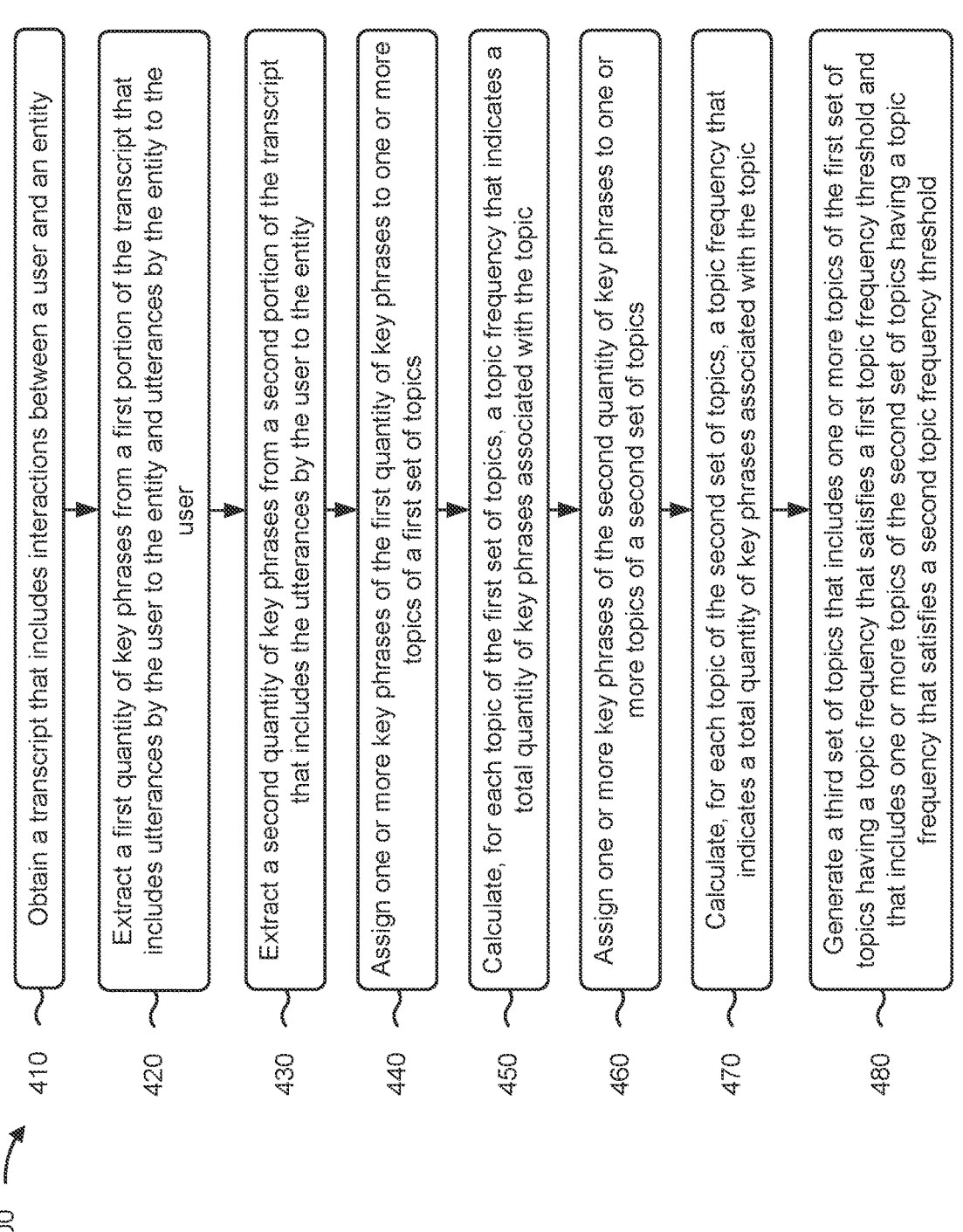

400

410　Obtain a transcript that includes interactions between a user and an entity

420　Extract a first quantity of key phrases from a first portion of the transcript that includes utterances by the user to the entity and utterances by the entity to the user 430　Extract a second quantity of key phrases from a second portion of the transcript that includes the utterances by the user to the entity 440　Assign one or more key phrases of the first quantity of key phrases to one or more topics of a first set of topics 450　Calculate, for each topic of the first set of topics, a topic frequency that indicates a total quantity of key phrases associated with the topic 460　Assign one or more key phrases of the second quantity of key phrases to one or more topics of a second set of topics 470　Calculate, for each topic of the second set of topics, a topic frequency that indicates a total quantity of key phrases associated with the topic 480　Generate a third set of topics that includes one or more topics of the first set of topics having a topic frequency that satisfies a first topic frequency threshold and that includes one or more topics of the second set of topics having a topic frequency that satisfies a second topic frequency threshold

FIG. 4

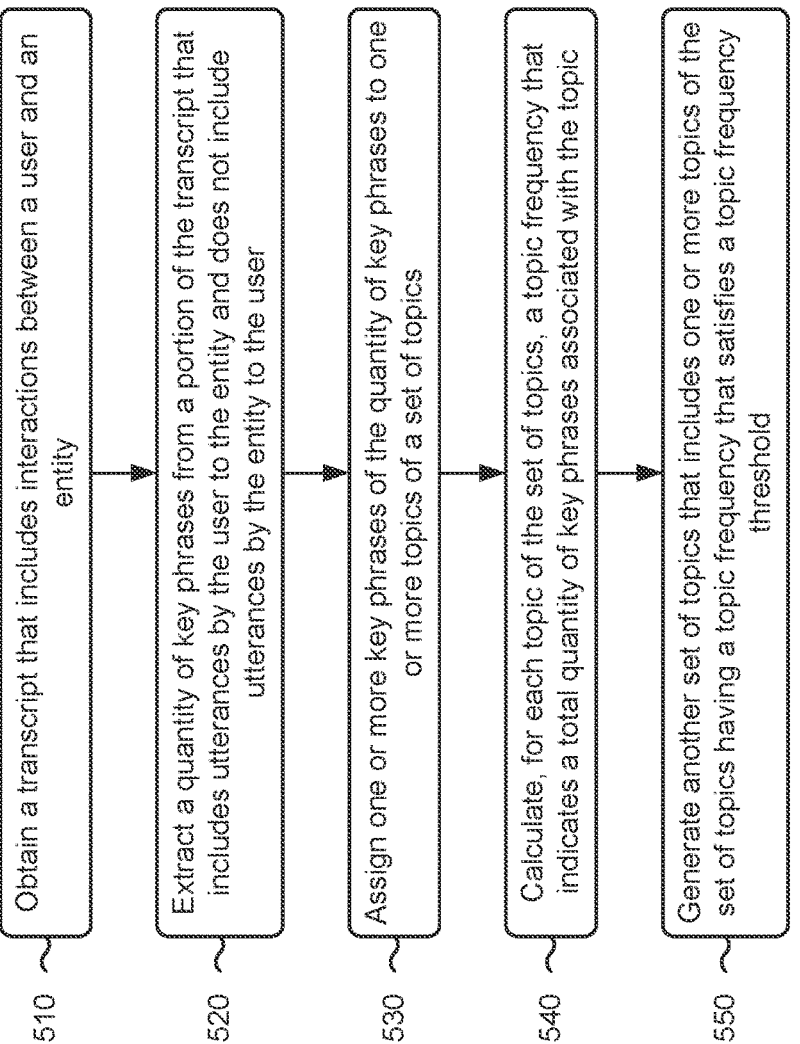

510   Obtain a transcript that includes interactions between a user and an entity 520   Extract a quantity of key phrases from a portion of the transcript that includes utterances by the user to the entity and does not include utterances by the entity to the user 530   Assign one or more key phrases of the quantity of key phrases to one or more topics of a set of topics 540   Calculate, for each topic of the set of topics, a topic frequency that indicates a total quantity of key phrases associated with the topic 550   Generate another set of topics that includes one or more topics of the set of topics having a topic frequency that satisfies a topic frequency threshold

KEY PHRASE TOPIC ASSIGNMENT

BACKGROUND

Audio-to-text (sometimes referred to as voice-to-text or speech recognition) assists in the conversion of human speech into a text transcript. Audio or video files can be transcribed into text automatically by a device. For example, with speech recognition technology, the device can automatically convert audio to text transcripts. Compared to audio data, a text transcript is searchable and may be stored using fewer memory resources.

SUMMARY

Some implementations described herein relate to a system for key phrase topic assignment. The system may include one or more memories and one or more processors communicatively coupled to the one or more memories. The one or more processors may be configured to obtain a transcript that includes interactions between a user and an entity. The one or more processors may be configured to extract a first quantity of key phrases from a first portion of the transcript that includes utterances by the user to the entity and utterances by the entity to the user. The one or more processors may be configured to extract a second quantity of key phrases from a second portion of the transcript that includes utterances by the user to the entity. The one or more processors may be configured to assign one or more key phrases of the first quantity of key phrases to one or more topics of a first set of topics. The one or more processors may be configured to calculate, for each topic of the first set of topics, a topic frequency that indicates a total quantity of key phrases associated with the topic. The one or more processors may be configured to assign one or more key phrases of the second quantity of key phrases to one or more topics of a second set of topics. The one or more processors may be configured to calculate, for each topic of the second set of topics, a topic frequency that indicates a total quantity of key phrases associated with the topic. The one or more processors may be configured to generate a third set of topics that includes one or more topics of the first set of topics having a topic frequency that satisfies a first topic frequency threshold and that includes one or more topics of the second set of topics having a topic frequency that satisfies a second topic frequency threshold.

Some implementations described herein relate to a method of key phrase topic assignment. The method may include obtaining a transcript that includes utterances between a user and an entity. The method may include extracting a first quantity of key phrases from the transcript. The method may include extracting a second quantity of key phrases from a portion of the transcript, the portion of the transcript including a subset of the utterances included in the transcript. The method may include assigning one or more key phrases of the first quantity of key phrases to one or more topics of a first set of topics. The method may include calculating, for each topic of the first set of topics, a topic frequency that indicates a total quantity of key phrases associated with the topic. The method may include assigning one or more key phrases of the second quantity of key phrases to one or more topics of a second set of topics. The method may include calculating, for each topic of the second set of topics, a topic frequency that indicates a total quantity of key phrases associated with the topic. The method may include generating a third set of topics that includes one or more topics of the first set of topics having a topic frequency that satisfies a first topic frequency threshold and that includes one or more topics of the second set of topics having a topic frequency that satisfies a second topic frequency threshold.

Some implementations described herein relate to a non-transitory computer-readable medium that stores a set of instructions. The set of instructions, when executed by one or more processors of a device, may cause the device to obtain a transcript that includes interactions between a user and an entity. The set of instructions, when executed by one or more processors of the device, may cause the device to extract a quantity of key phrases from a portion of the transcript that includes utterances by the user to the entity and does not include utterances by the entity to the user. The set of instructions, when executed by one or more processors of the device, may cause the device to assign one or more key phrases of the quantity of key phrases to one or more topics of a set of topics. The set of instructions, when executed by one or more processors of the device, may cause the device to calculate, for each topic of the set of topics, a topic frequency that indicates a total quantity of key phrases associated with the topic. The set of instructions, when executed by one or more processors of the device, may cause the device to generate another set of topics that includes one or more topics of the set of topics having a topic frequency that satisfies a topic frequency threshold.

BRIEF DESCRIPTION OF THE DRAWINGS

FIG. 4 is a flowchart of an example process associated with key phrase topic assignment, in accordance with some embodiments of the present disclosure.

FIG. 5 is a flowchart of an example process associated with key phrase topic assignment, in accordance with some embodiments of the present disclosure.

DETAILED DESCRIPTION

Figure 1A:
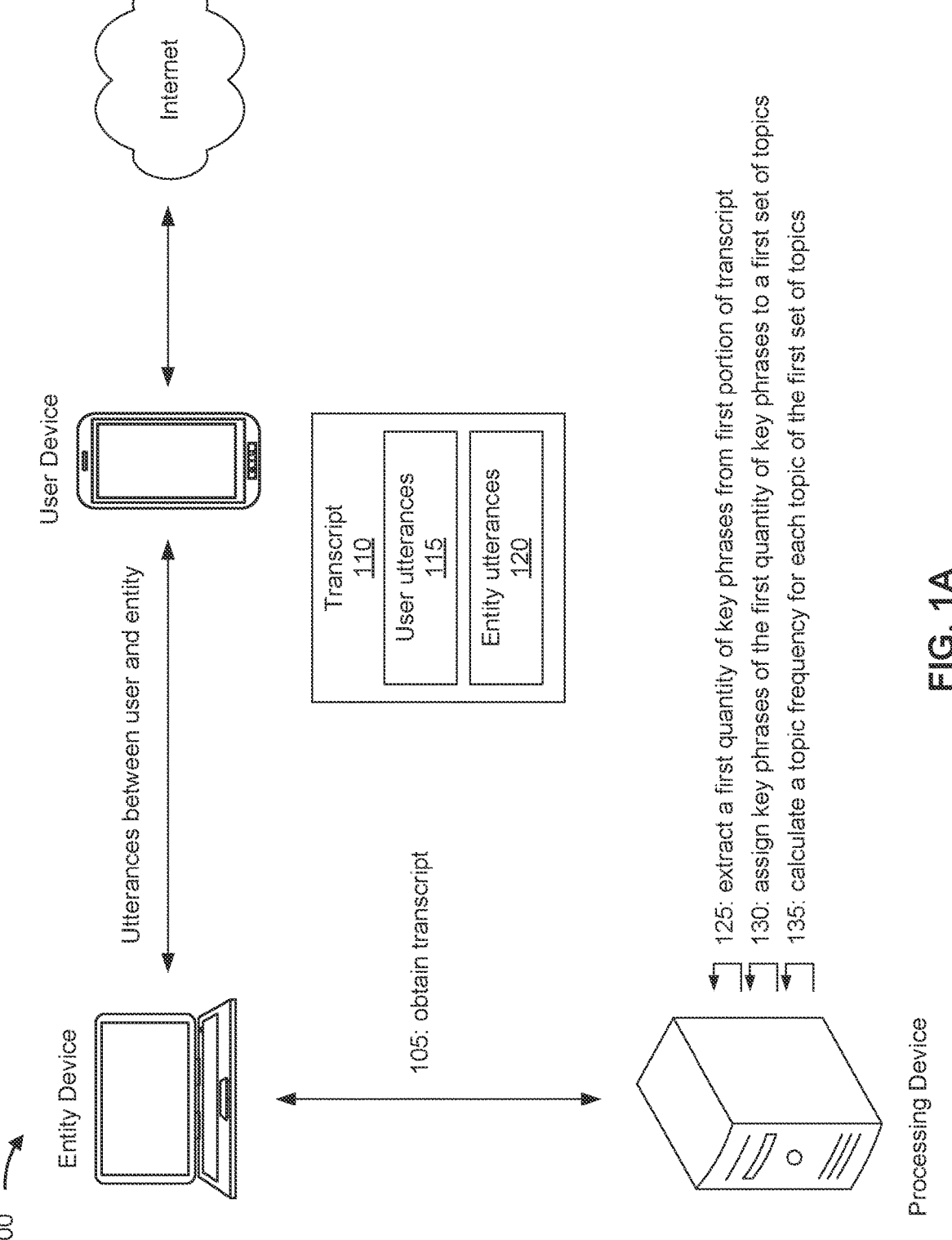
FIGS. 1A-1B are diagrams of an example associated with key phrase topic assignment, in accordance with some embodiments of the present disclosure.

The following detailed description of example implementations refers to the accompanying drawings. The same reference numbers in different drawings may identify the same or similar elements.

Audio or video files can be transcribed into text by a device. For example, the device may automatically convert audio to text transcripts, and may store the text transcripts instead of (or in addition to) the audio. In one example, a transcript may be generated based on a conversation between a user (for example, a customer) and an entity (for example, a vehicle financing entity). The transcript may include utterances by the user to the entity and may include utterances by the entity to the user. The system may be configured to parse the transcript for key phrase topic assignment. For example, the system may obtain an indication of one or more key phrases to be identified in the transcript, and may search the transcript for occurrences of the one or more key phrases. In the example that the transcript is generated based on the conversion between the user and the entity, the key phrases may include "sedan" and "all-wheel drive." The system may identify a quantity of occurrences of the one or more key phrases in the transcript. For example, the system may identify that the key phrase "sedan" is included in the transcript six times and that the key phrase "all-wheel drive" is included in the transcript four times. The system may assign one or more of the key phrases to one or more topics. For example, the key phrases "sedan" and "all-wheel drive" may be assigned to a "vehicle information" topic. This may enable the system to analyze the transcript to determine whether a topic was discussed during the interaction between the user and the entity and/or to determine a quantity of utterances of the key phrases associated with the topic. However, the system may not be able to determine an importance metric for the key phrases. For example, the system may not be able to distinguish between key phrases that have a lower importance level (such as key phrases corresponding to utterances by the entity to the user) and key phrases that have a higher importance level (such as key phrases corresponding to utterances by the user to the entity). In the example above, the term "sedan" may be uttered by the entity two times and may be uttered by the user four times, which may indicate that the key phrase "sedan" is important to the user. In contrast, the term "all-wheel drive" may be uttered by the entity four times and may be uttered by the user zero times, which may indicate that the term "all-wheel drive" is not important to the user. However, the system may not be able to distinguish between the key phrases having the higher importance level and the key phrases having the lower importance level. This may result in transcripts that are less valuable to the system, for example, since an analysis of the transcript may not differentiate between utterances by the user to the entity and utterances by the entity to the user. This may result in wasted processing resources, for example, by the system performing key phrase topic assignment for utterances that do not have high value. Additionally, this may result in wasted storage resources, for example, by storing key phrases, topics, and transcripts for utterances that do not have high value.

Some implementations described herein enable key phrase topic assignment. In some implementations, a system may obtain a transcript that is generated based on a conversation between a user (for example, a customer) and an entity (for example, a vehicle financing entity). The system may extract a first quantity of key phrases from a first portion of the transcript. The first portion of the transcript may include utterances by the user to the entity and may include utterances by the entity to the user. In some examples, the first portion of the transcript may be an entirety of the transcript. The first quantity of key phrases may correspond to a top quantity of key phrases included in the first portion of the transcript. The system may identify that the key phrase "sedan" is included in the first portion of the transcript six times, the key phrase "all-wheel drive" is included in the first portion of the transcript four times, and the key phrase "blue" is included in the first portion of the transcript three times. The system may assign the key phrases extracted from the first portion of the transcript to a first set of topics. For example, the system may assign the key phrases "sedan," "all-wheel drive," and "blue" to a "vehicle information" topic and may assign the key phrase "blue" to a "color" topic. The system may calculate a topic frequency for each topic associated with the first portion of the transcript. The topic frequency may correspond to a total quantity of key phrase utterances associated with the topic. For example, the system may calculate that the "vehicle information" topic has a topic frequency of thirteen and the "color" topic has a topic frequency of three.

The system may extract a second quantity of key phrases from a second portion of the transcript. The second portion of the transcript may include utterances by the user to the entity (for example, all utterances by the user to the entity) but may not include any utterances by the entity to the user. The second quantity of key phrases may correspond to a top quantity of key phrases included in the second portion of the transcript. The system may identify that the key phrase "sedan" is included in the second portion of the transcript two times and that the key phrase "all-wheel drive" is included in the second portion of the transcript four times. The key phrase "blue" may not be included in the second portion of the transcript, for example, since utterances of the key phrase "blue" correspond to utterances by the agent to the user. The system may assign one or more key phrases extracted from the second portion of the transcript to a second set of topics. For example, the system may assign the key phrases "sedan" and "all-wheel drive" to the "vehicle information" topic. The system may calculate a topic frequency for each topic associated with the second portion of the transcript. For example, the system may calculate that the "vehicle information" topic has a topic frequency of six.

The system may identify a first topic frequency threshold associated with the first portion of the transcript and may identify a second topic frequency threshold associated with the second portion of the transcript. The system may generate a final set of topics in accordance with one or more topics of the first set of topics satisfying the first topic frequency threshold and in accordance with one or more topics of the second set of topics satisfying the second topic frequency threshold. For example, a topic may only be included in the final set of topics in accordance with the topic being included in the first set of topics (associated with the first portion of the transcript) and in the second set of topics (associated with the second portion of the transcript), and in accordance with a quantity of key phrase utterances for the topic in the first portion of the transcript satisfying the first frequency threshold and the quantity of key phrase utterances for the topic in the second portion of the transcript satisfying the second frequency threshold. This may result in transcripts that are more valuable to the system, for example, since the data associated with the transcript may differentiate between utterances having a higher importance metric (such as utterances by the user to the entity) and utterances having a lower importance metric (such as utterances by the entity to the user). This may require fewer processing resources, for example, since the system may perform key phrase topic assignment only for utterances having the higher value. Additionally, this may require fewer storage resources, for example, since the system may store key phrases, topics, and transcripts only for utterances having the higher value. In some implementations, the system may adjust one or more parameters for performing the key phrase extraction. For example, the system may adjust a first parameter corresponding to a quantity of key phrases to be extracted from the first portion of the transcript, a second parameter corresponding to the first topic frequency threshold, a third parameter corresponding to a quantity of key phrases to be extracted from the third portion of the transcript, and/or a fourth parameter corresponding to the second topic frequency threshold. This may enable the system to adjust the quantity of key phrases to be extracted and/or to adjust a topic frequency threshold in order to satisfy a performance indicator (e.g., metric), such as a precision metric, a recall metric, or a function (such as a harmonic mean) of the precision metric and the recall metric. These example advantages, among others, are described in more detail below.

Figure 1B:
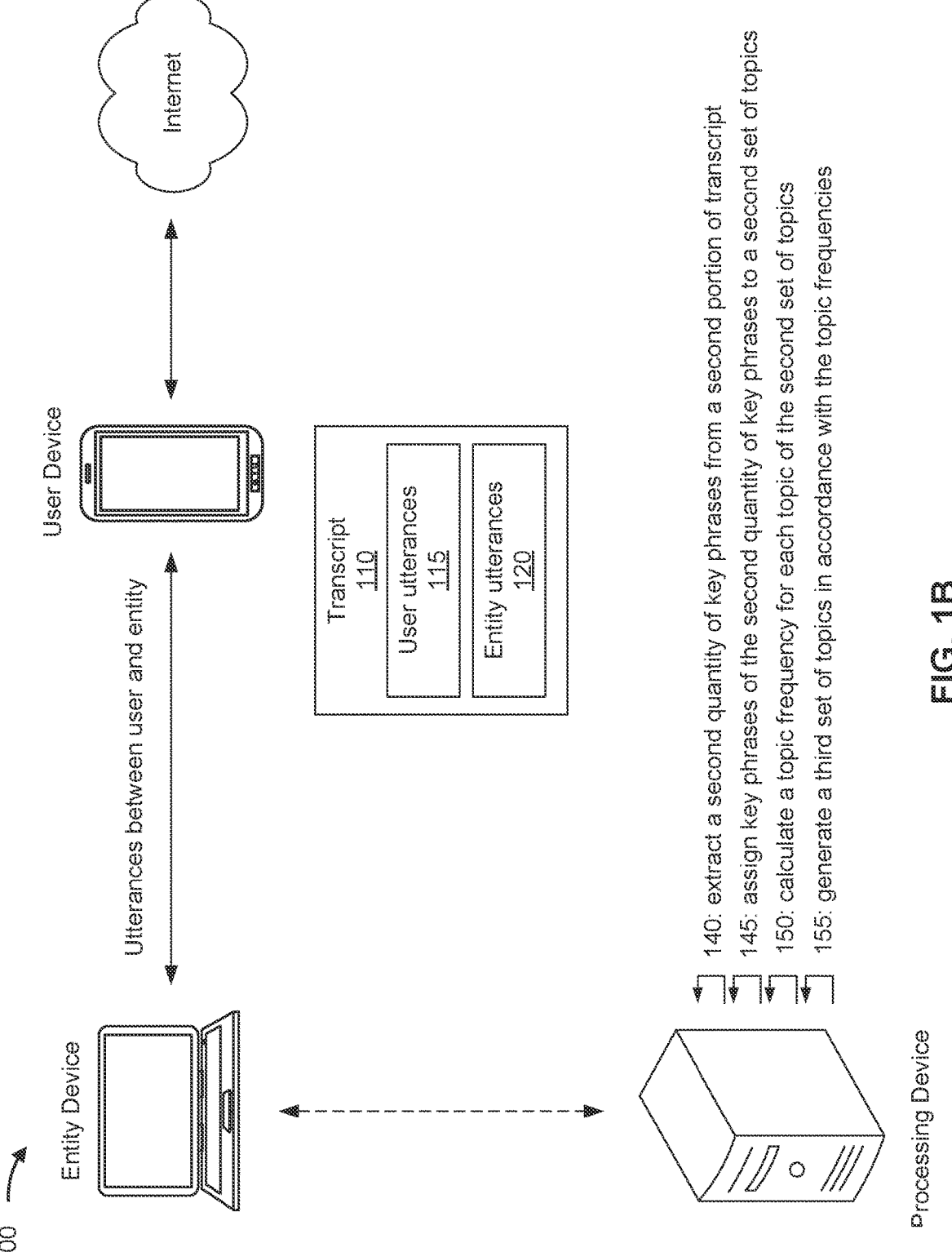

FIGS. 1A-1B are diagrams of an example 100 associated with key phrase topic assignment. As shown in FIGS. 1A-1B, example 100 includes a user device, an entity device, and a processing device. The user device and the entity device may communicate via the Internet. In some implementations, the entity device and the processing device may communicate via the Internet. In some other implementations, the processing device may be included within the entity device. Additional details associated with the user device, the entity device, and the processing device are described in connection with FIG. 2.

As shown in FIG. 1A, and by reference number 105, the processing device may obtain a transcript. For example, the processing device may obtain a transcript 110 from the entity device. The transcript 110 may be associated with communications between a user (associated with the user device) and an entity (associated with the entity device). The transcript 110 may include user utterances 115 (associated with utterances by the user to the entity) and entity utterances 120 (associated with utterances by the entity to the user). In one example, the user may be a customer and the entity may be a vehicle financing entity.

As shown by reference number 125, the processing device may extract a first quantity of key phrases from a first portion of the transcript. In some implementations, the first portion of the transcript may correspond to an entirety of the transcript 110, and may include the user utterances 115 and the entity utterances 120. The first quantity of key phrases may include a top quantity of key phrases to be extracted from the first portion of the transcript. In some implementations, extracting the first quantity of key phrases from the first portion of the transcript may include extracting the first quantity of key phrases from the first portion of the transcript using one or more part-of-speech tags from the first portion of the transcript. In some implementations, the top quantity of key phrases may be extracted from the first portion of the transcript in accordance with a parameter that is adjustable by the processing device. Additional details regarding these features are described in more detail below. In one example, the first quantity of key phrases may include the key phrases "SUV," "mid-size," "debit card number," and "debit card payment." The processing device may identify that the key phrase "SUV" is included in the first portion of the transcript twelve times, the key phrase "mid-size" is included in the first portion of the transcript seven times, the key phrase "debit card number" is included in the first portion of the transcript six times, and the key phrase "debit card payment" is included in the first portion of the transcript five times.

As shown by reference number 130, the processing device may assign one or more key phrases of the first quantity of key phrases to one or more topics (e.g., a first set of topics). In one example, the topics may include a "vehicle information" topic and a "payment information" topic. The processing device may assign the utterances associated with the key phrases "SUV" and "mid-size" to the "vehicle information" topic, and may assign the utterances associated with the key phrases "debit card number" and "debit card payment" to the "payment information" topic. In some implementations, the processing device may assign a key phrase of the first quantity of key phrases to one or more topics based on determining a distance between the key phrase and a (pre-defined) list of topics, and assigning the key phrase to one or more topics based on a similarity between the key phrase and the one or more topics included in the list of topics.

As shown by reference number 135, the processing device may calculate a topic frequency for each topic of the first set of topics. The topic frequency may indicate a total quantity of key phrase utterances associated with the topic. In one example, the processing device may calculate a topic frequency of nineteen for the "vehicle information" topic (for example, based on twelve utterances of the key phrase "SUV" and seven utterances of the key phrase "mid-size"). Additionally, the processing device may calculate a topic frequency of eleven for the "payment information" topic (for example, based on six utterances of the key phrase "debit card number" and five utterances of the key phrase "debit card payment").

As shown in FIG. 1B, and by reference number 140, the processing device may extract a second quantity of key phrases from a second portion of the transcript 110. In some implementations, the second portion of the transcript 110 may include the user utterances 115 but may not include any entity utterances 120. The second quantity of key phrases may include a top quantity of key phrases to be extracted from the second portion of the transcript. In some implementations, extracting the second quantity of key phrases from the second portion of the transcript may include extracting the second quantity of key phrases from the second portion of the transcript using one or more part-of-speech tags from the second portion of the transcript. In some implementations, the top quantity of key phrases may be extracted from the second portion of the transcript in accordance with a parameter that is adjustable by the processing device. Additional details regarding these features are described in more detail below. In one example, the second quantity of key phrases may include the key phrases "SUV," "mid-size," and "debit card number." The processing device may identify that the key phrase "SUV" is included in the second portion of the transcript nine times, the key phrase "mid-size" is included in the second portion of the transcript six times, and the key phrase "debit card number" is included in the second portion of the transcript four times. The key phrase "debit card payment" is not included in the second portion of the transcript, for example, because the key phrase "debit card payment" is not included in the user utterances 115 of the transcript 110.

In some implementations, the processing device may order (e.g., rank-order) the list of key phrases based on a similarity of the key phrases to the transcript, a diversity of the key phrases, or a combination of the similarity and the diversity. For example, the processing device may order the list of key phrases using a maximum marginal relevance (MMR) process. The processing device may identify the top quantity of key phrases based on ordering the list of key phrases and in accordance with one or more parameters (as described herein).

As shown by reference number 145, the processing device may assign one or more key phrases of the second quantity of key phrases to one or more topics (e.g., a second set of topics). In one example, the topics may include a "vehicle information" topic and a "payment information" topic. The processing device may assign the utterances associated with the key phrases "SUV" and "mid-size" to the "vehicle information" topic, and may assign the utterances associated with the key phrase "debit card number" to the "payment information" topic. In some implementations, the processing device may assign a key phrase of the second quantity of key phrases to one or more topics based on determining a distance between the key phrase and a (pre-defined) list of topics, and assigning the key phrase to one or more topics based on a similarity between the key phrase and the one or more topics included in the list of topics.

As shown by reference number 150, the processing device may calculate a topic frequency for each topic of the second set of topics. The topic frequency may indicate a total quantity of key phrase utterances associated with the topic. In one example, the processing device may calculate a topic frequency of fifteen for the "vehicle information" topic (for example, based on nine utterances of the key phrase "SUV" and six utterances of the key phrase "mid-size"). Additionally, the processing device may calculate a topic frequency of four for the "payment information" topic (for example, based on four utterances of the key phrase "debit card number" and zero utterances of the key phrase "debit card payment").

As shown by reference number 155, the processing device may generate a third set of topics (e.g., a final set of topics) in accordance with the first topic frequency and the second topic frequency. For example, the processing device may generate the third set of topics in accordance with the first topic frequency, a first topic frequency threshold, the second topic frequency, and a second topic frequency threshold.

In some implementations, the processing device may identify or calculate the first topic frequency threshold. The first topic frequency threshold may indicate a minimum number of key phrase utterances for a topic of the first set of topics (associated with the first portion of the transcript) in order for the topic to be included in the third set of topics. Additionally, the processing device may identify or calculate the second topic frequency threshold. The second topic frequency threshold may indicate a minimum number of key phrase utterances for a topic of the second set of topics (associated with the second portion of the transcript) in order for the topic to be included in the third set of topics. In one example, the first topic frequency threshold may be eight and the second topic frequency threshold may be three. In this example, the third set of topics may include the "vehicle information" topic and the "payment information" topic in accordance with the "vehicle information" topic for the first portion of the transcript including nineteen key phrase utterances (which is greater than eight) and the "payment information" topic for the first portion of the transcript including eleven key phrase utterances (which is greater than eight), and in accordance with the "vehicle information" topic for the second portion of the transcript including fifteen key phrase utterances (which is greater than three) and the "payment information" topic for the second portion of the transcript including four key phrase utterances (which is greater than three). In another example, the first topic frequency threshold may be ten and the second topic frequency threshold may be five. In this example, the third set of topics may include the "vehicle information" topic but may not include the "payment information" topic in accordance with the "vehicle information" topic for the first portion of the transcript including nineteen key phrase utterances (which is greater than ten) and the "payment information" topic for the first portion of the transcript including eleven key phrase utterances (which is greater than ten), and in accordance with the "vehicle information" topic for the second portion of the transcript including fifteen key phrase utterances (which is greater than five) and the "payment information" topic for the second portion of the transcript including four key phrase utterances (which less than five). Thus, since the quantity of key phrase utterances included in the "payment information" topic for the second portion of the transcript does not satisfy the second frequency threshold, the "payment information" topic may not be included in the third (final) set of topics.

In some implementations, the processing device may generate a first set of clusters in accordance with performing a first unsupervised clustering based on a similarity between the plurality of key phrases from the user utterances 115 and based on a similarity between the plurality of key phrases from the entity utterances 120. The system may generate a second set of clusters in accordance with performing a second unsupervised clustering based on a similarity between the plurality of key phrases from the user utterances 115. The processing device, to assign one or more key phrases of the first quantity of key phrases to one or more topics of the first set of topics, may be configured to map one or more clusters of the first set of clusters to one or more topics of the first set of topics, and assign a most frequent key phrase and/or a most relevant key phrase (e.g., based on a user input) included the first set of clusters as a root key phrase for a topic of the first set of topics. The processing device, to assign one or more key phrases of the second quantity of key phrases to one or more topics of the second set of topics, may be configured to map one or more clusters of the second set of clusters to one or more topics of the second set of topics, and assign a most frequent key phrase and/or a most relevant key phrase included the second set of clusters as a root key phrase for a topic of the second set of topics. In some examples, the first set of topics and the second set of topics may be the same set of topics. In some other examples, the first set of topics and the second set of topics may be different sets of topics. In some implementations, the processing device may be configured to extract, from the transcript 110, all key phrases associated with a plurality of topics. The processing device, to assign a key phrase of the first quantity of key phrases to a topic of the first set of topics, may be configured to assign the key phrase of the first quantity of key phrases to the topic of the first set of topics in accordance with at least one of a root word associated with the key phrase of the first quantity of key phrases and a root word associated with the topic of the first set of topics. Additionally, the processing device, to assign a key phrase of the second quantity of key phrases to a topic of the second set of topics, may be configured to assign the key phrase of the second quantity of key phrases to the topic of the second set of topics in accordance with at least one of a root word associated with the key phrase of the second quantity of key phrases and a root word associated with the topic of the second set of topics.

In some implementations, the processing device may be configured to adjust one or more parameters for key phrase extraction. The one or more parameters may include a first parameter (n) corresponding to the first quantity of key phrases to be extracted from the first portion of the transcript, a second parameter (x) corresponding to the first frequency threshold, a third parameter (m) corresponding to the second quantity of key phrases to be extracted from the second portion of the transcript, and a fourth parameter (y) corresponding to the second frequency threshold. This may enable the processing device to adjust the key phrase topic assignment in order to satisfy different system requirements. In some implementations, the processing device may adjust the one or more parameters to satisfy at least one of a precision metric (e.g., a precision indicator), a recall metric (e.g., a recall indicator), or an F1 metric. The precision metric may indicate a proportion of true positive predictions out of all positive predictions by a model, the recall metric may indicate a proportion of true positive predictions out of all actual positive instances in a dataset, and the F1 metric may be a function (such as a harmonic mean) of the precision metric and the recall metric. In one example, the processing device may increase the topic frequency threshold parameters (x and/or y) to achieve a higher precision and to ensure that there is significant discussion (between the user and the entity) over a theme in order for the model to classify it as a topic. In another example, the processing device may increase the parameter associated with the quantity of key phrases (n and/or m) extracted from the first portion of the transcript and the second portion of the transcript in order to achieve a higher recall and to ensure that all utterances included within the transcript are considered by the model. In one example, the parameters may be adjusted to maximize the F1 metric. As shown in Table 1, a performance of the proposed model (that uses key phrase extraction and topic assignment for a plurality of transcript portions and/or that is capable of adjusting one or more parameters) increased a precision by ten percent, a recall by two percent, and an F1 score by six percent as compared to a previous model (that only uses key phrase extraction and topic assignment for an entirety of the transcript and/or that is not capable of adjusting the one or more parameters).

TABLE 1

|  | Precision | Recall | F1 Score |
| --- | --- | --- | --- |
| Previous Model | 0.55 | 0.64 | 0.59 |
| Proposed Model | 0.65 | 0.66 | 0.64 |

As described herein, current key phrase topic assignment systems may not be able to distinguish between key phrases having a higher importance level (such as key phrases uttered by a user) and key phrases having a lower importance level (such as key phrases uttered by an entity). This may result in transcripts that are less valuable to the system, for example, since an analysis of the transcript may not differentiate between utterances by the user to the entity and utterances by the entity to the user. This may result in wasted processing resources, for example, by the system performing key phrase topic assignment for utterances that do not have high value. Additionally, this may result in wasted storage resources, for example, by storing key phrases, topics, and transcripts for utterances that do not have high value. In contrast, the proposed key phrase topic assignment system may be able to distinguish between the utterances having the higher importance level and the utterances having the lower importance level. This may result in transcripts that are more valuable to the system, may require fewer processing resources (for example, because the system may perform key phrase topic assignment only for utterances having the higher value), and may require fewer storage resources (for example, because the system may store key phrases, topics, and transcripts only for utterances having the higher value).

As indicated above, FIGS. 1A-1B are provided as an example. Other examples may differ from what is described with regard to FIGS. 1A-1B.

Figure 2:
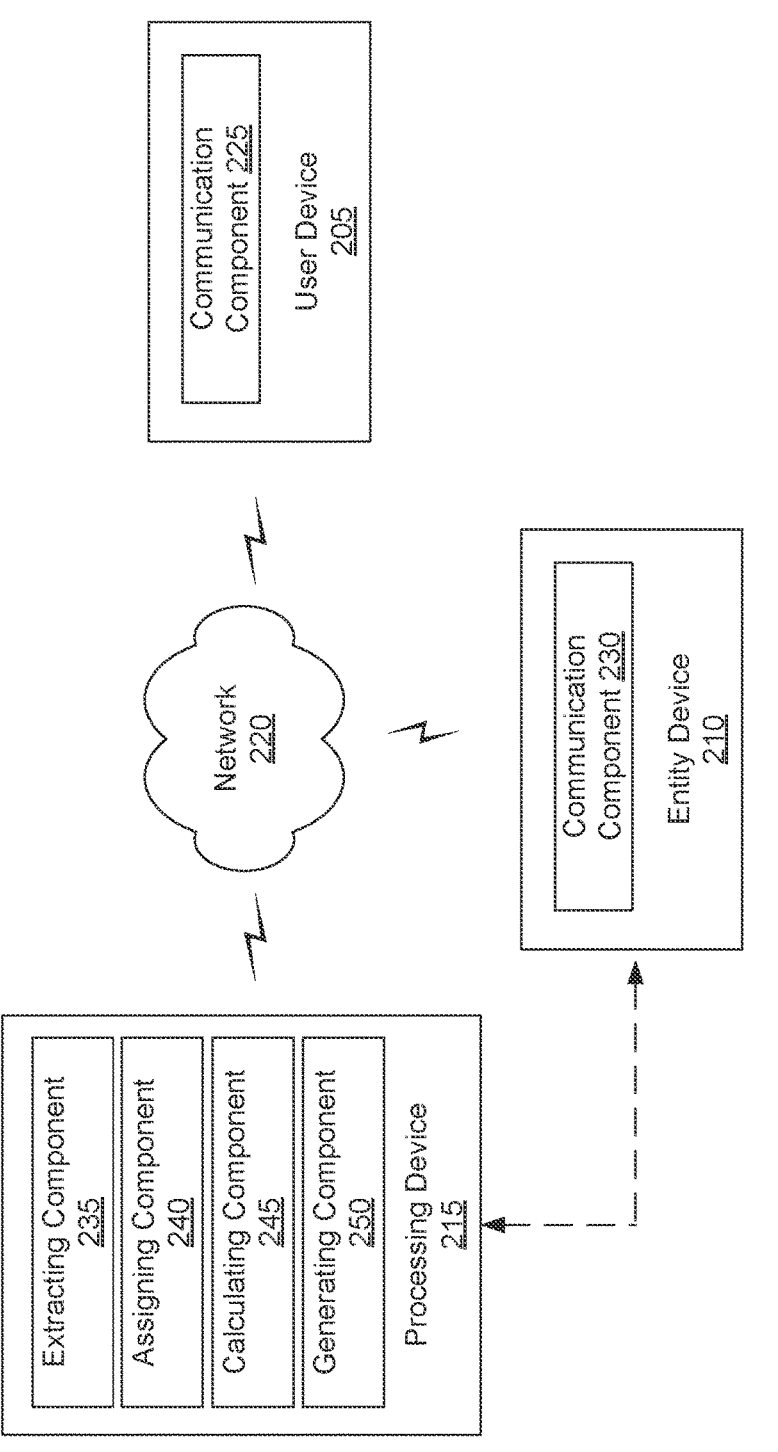
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a user device 205, an entity device 210, a processing device 215, and a network 220. The network 220 may include wired connections, wireless connections, or a combination of wired and wireless connections.

The network 220 may include one or more wired and/or wireless networks. For example, the network 220 may include a cellular network (e.g., a long-term evolution (LTE)

network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The user device 205 may communicate with the entity device 210. The user device 205 may communicate with the entity device 210 using a communication component 225 associated with the user device 205. In some implementations, the user device 205 may correspond to the user device described in connection with FIGS. 1A-1B. The user device 205 may communicate with the entity device 210 via the network 220. For example, the user device 205 may be a wireless device that communicates with the entity device 210 via a wireless network associated with the network 220.

The entity device 210 may communicate with the user device 205. The entity device 210 may communicate with the user device 205 using a communication component 230 associated with the entity device 210. In some implementations, the entity device 210 may correspond to the entity device described in connection with FIGS. 1A-1B. The entity device 210 may communicate with the user device 205 via the network 220. For example, the entity device 210 may be a wireless device that communicates with the user device 205 via a wireless network associated with the network 220.

The processing device 215 may include an extracting component 235, an assigning component 240, a calculating component 245, and/or a generating component 250. The processing device 215 may correspond to the processing device described in connection with FIGS. 1A-1B. In some implementations, the processing device 215 may be included within the entity device 210 and/or may communicate with the entity device 210 using a wired connection. In some other implementations, the processing device 215 may be located externally to the entity device 210 and/or may communicate with the entity device 210 via a wireless network, such as the wireless network associated with the network 220. The extracting component 235 may be configured to extract one or more key phrases from a transcript, such as a transcript associated with a conversation between a user of the user device 205 and an entity associated with the entity device 210. The assigning component 240 may be configured to assign one or more of the key phrases to one or more topics. The calculating component 245 may be configured to calculate a topic frequency for the one or more topics. The generating component 250 may be configured to generate a final set of topics in accordance with the topic frequency and a topic frequency threshold. Additional details regarding these features are described in connection with FIGS. 1A-1B.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
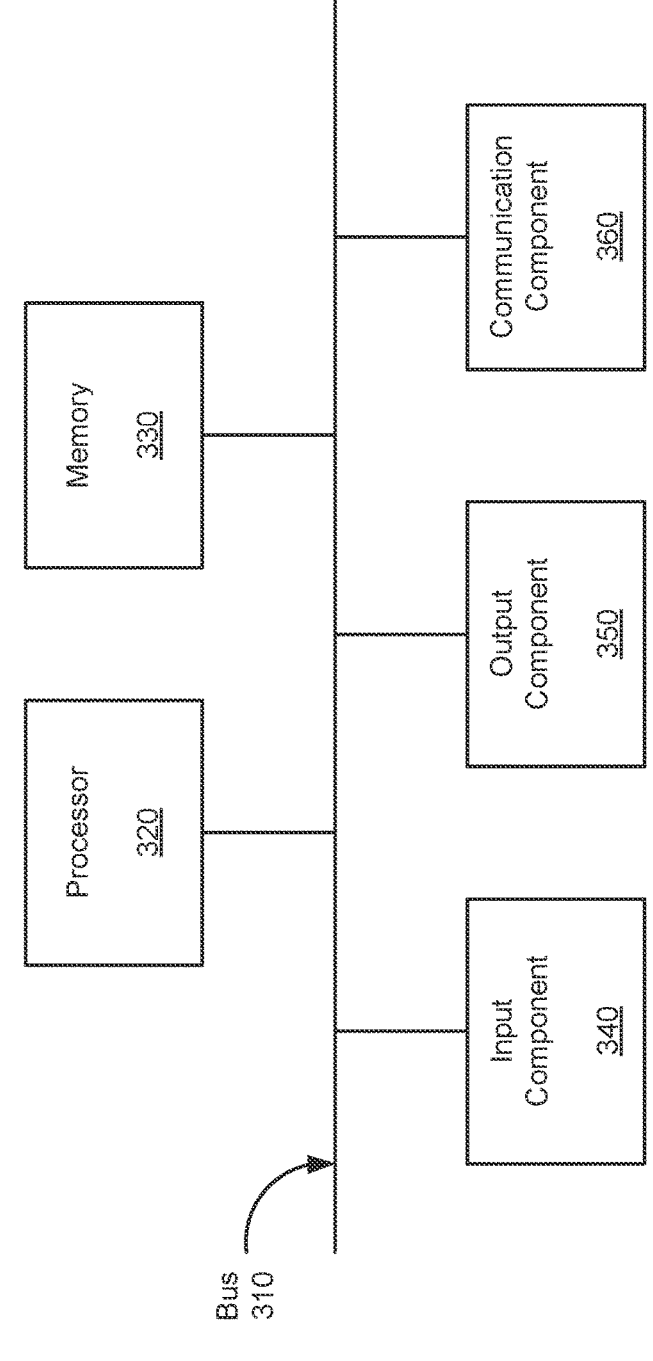
FIG. 3 is a diagram of example components of a device associated with key phrase topic assignment, in accordance with some embodiments of the present disclosure.

FIG. 3 is a diagram of example components of a device 300 associated with key phrase topic assignment. The device 300 may correspond to the user device 205, the entity device 210, and/or the processing device 215. In some implementations, the user device 205, the entity device 210, and/or the processing device 215 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with key phrase topic assignment. In some implementations, one or more process blocks of FIG. 4 may be performed by the processing device 215. In some implementations, one or more process blocks of FIG. 4 may be performed by another device or a group of devices separate from or including the processing device 215, such as the extracting component 235, the assigning component 240, the calculating component 245, and/or the generating component 250. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include obtaining a transcript that includes interactions between a user and an entity (block 410). For example, the processing device 215 (e.g., using processor 320 and/or memory 330) may obtain a transcript that includes interactions between a user and an entity, as described above in connection with reference number 105 of FIGS. 1A-1B.

As further shown in FIG. 4, process 400 may include extracting a first quantity of key phrases from a first portion of the transcript that includes utterances by the user to the entity and utterances by the entity to the user (block 420). For example, the processing device 215 (e.g., using processor 320 and/or memory 330) may extract a first quantity of key phrases from a first portion of the transcript that includes utterances by the user to the entity and utterances by the entity to the user, as described above in connection with reference number 125 of FIGS. 1A-1B.

As further shown in FIG. 4, process 400 may include extracting a second quantity of key phrases from a second portion of the transcript that includes utterances by the user to the entity (block 430). For example, the processing device 215 (e.g., using processor 320 and/or memory 330) may extract a second quantity of key phrases from a second portion of the transcript that includes utterances by the user to the entity, as described above in connection with reference number 140 of FIGS. 1A-1B.

As further shown in FIG. 4, process 400 may include assigning one or more key phrases of the first quantity of key phrases to one or more topics of a first set of topics (block 440). For example, the processing device 215 (e.g., using processor 320 and/or memory 330) may assign one or more key phrases of the first quantity of key phrases to one or more topics of a first set of topics, as described above in connection with reference number 130 of FIGS. 1A-1B.

As further shown in FIG. 4, process 400 may include calculating, for each topic of the first set of topics, a topic frequency that indicates a total quantity of key phrases associated with the topic (block 450). For example, the processing device 215 (e.g., using processor 320 and/or memory 330) may calculate, for each topic of the first set of topics, a topic frequency that indicates a total quantity of key phrases associated with the topic, as described above in connection with reference number 135 of FIGS. 1A-1B.

As further shown in FIG. 4, process 400 may include assigning one or more key phrases of the second quantity of key phrases to one or more topics of a second set of topics (block 460). For example, the processing device 215 (e.g., using processor 320 and/or memory 330) may assign one or more key phrases of the second quantity of key phrases to one or more topics of a second set of topics, as described above in connection with reference number 145 of FIGS. 1A-1B.

As further shown in FIG. 4, process 400 may include calculating, for each topic of the second set of topics, a topic frequency that indicates a total quantity of key phrases associated with the topic (block 470). For example, the processing device 215 (e.g., using processor 320 and/or memory 330) may calculate, for each topic of the second set of topics, a topic frequency that indicates a total quantity of key phrases associated with the topic, as described above in connection with reference number 150 of FIGS. 1A-1B.

As further shown in FIG. 4, process 400 may include generating a third set of topics that includes one or more topics of the first set of topics having a topic frequency that satisfies a first topic frequency threshold and that includes one or more topics of the second set of topics having a topic frequency that satisfies a second topic frequency threshold (block 480). For example, the processing device 215 (e.g., using processor 320 and/or memory 330) may generate a third set of topics that includes one or more topics of the first set of topics having a topic frequency that satisfies a first topic frequency threshold and that includes one or more topics of the second set of topics having a topic frequency that satisfies a second topic frequency threshold, as described above in connection with reference number 155 of FIGS. 1A-1B.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1B. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

FIG. 5 is a flowchart of an example process 500 associated with key phrase topic assignment. In some implementations, one or more process blocks of FIG. 5 may be performed by the processing device 215. In some implementations, one or more process blocks of FIG. 5 may be performed by another device or a group of devices separate from or including the processing device 215, such as the extracting component 235, the assigning component 240, the calculating component 245, and/or the generating component 250. Additionally, or alternatively, one or more process blocks of FIG. 5 may be performed by one or more components of the device 300, such as processor 320, memory 330, input component 340, output component 350, and/or communication component 360.

As shown in FIG. 5, process 500 may include obtaining a transcript that includes interactions between a user and an entity (block 510). For example, the processing device 215 (e.g., using processor 320 and/or memory 330) may obtain a transcript that includes interactions between a user and an entity, as described above in connection with reference number 105 of FIGS. 1A-1B.

As further shown in FIG. 5, process 500 may include extracting a quantity of key phrases from a portion of the transcript that includes utterances by the user to the entity and does not include utterances by the entity to the user (block 520). For example, the processing device 215 (e.g., using processor 320 and/or memory 330) may extract a quantity of key phrases from a portion of the transcript that includes utterances by the user to the entity and does not include utterances by the entity to the user, as described above in connection with reference number 140 of FIGS. 1A-1B.

As further shown in FIG. 5, process 500 may include assigning one or more key phrases of the quantity of key phrases to one or more topics of a set of topics (block 530). For example, the processing device 215 (e.g., using processor 320 and/or memory 330) may assign one or more key phrases of the quantity of key phrases to one or more topics of a set of topics, as described above in connection with reference number 145 of FIGS. 1A-1B.

As further shown in FIG. 5, process 500 may include calculating, for each topic of the set of topics, a topic frequency that indicates a total quantity of key phrases associated with the topic (block 540). For example, the processing device 215 (e.g., using processor 320 and/or memory 330) may calculate, for each topic of the set of topics, a topic frequency that indicates a total quantity of key phrases associated with the topic, as described above in connection with reference number 150 of FIGS. 1A-1B.

As further shown in FIG. 5, process 500 may include generating another set of topics that includes one or more topics of the set of topics having a topic frequency that satisfies a topic frequency threshold (block 550). For example, the processing device 215 (e.g., using processor 320 and/or memory 330) may generate another set of topics that includes one or more topics of the set of topics having a topic frequency that satisfies a topic frequency threshold, as described above in connection with reference number 155 of FIGS. 1A-1B.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1B. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for key phrase topic assignment, the system comprising:
   one or more memories; and
   one or more processors, communicatively coupled to the one or more memories, configured to:
   obtain a transcript that includes interactions between a user and an entity;
   extract a first quantity of key phrases from a first portion of the transcript that includes utterances by the user to the entity and utterances by the entity to the user;
   extract a second quantity of key phrases from a second portion of the transcript that includes utterances by the user to the entity;
   assign one or more key phrases of the first quantity of key phrases to one or more topics of a first set of topics;
   calculate, for each topic of the first set of topics, a topic frequency that indicates a total quantity of key phrases associated with the topic;
   assign one or more key phrases of the second quantity of key phrases to one or more topics of a second set of topics;
   calculate, for each topic of the second set of topics, a topic frequency that indicates a total quantity of key phrases associated with the topic;
   generate a third set of topics that includes one or more topics of the first set of topics having a topic frequency that satisfies a first topic frequency threshold and that includes one or more topics of the second set of topics having a topic frequency that satisfies a second topic frequency threshold; and
   store only the third set of topics and corresponding key phrases and transcripts.

2. The system of claim 1,
   wherein the first quantity of key phrases corresponds to a top quantity of key phrases included in the first portion of the transcript, and the second quantity of key phrases corresponds to a top quantity of key phrases included in the second portion of the transcript.

3. The system of claim 1, wherein the one or more processors, to generate the third set of topics, are configured to generate the third set of topics in accordance with a plurality of parameters, the plurality of parameters including:

a first parameter that indicates a value associated with the first quantity of key phrases to be extracted from the first portion of the transcript;

a second parameter that indicates a value associated with the second quantity of key phrases to be extracted from the second portion of the transcript;

a third parameter that indicates the first topic frequency threshold; and a fourth parameter that indicates the second topic frequency threshold.

4. The system of claim 3, wherein the one or more processors are further configured to adjust at least one of the first parameter, the second parameter, the third parameter, or the fourth parameter in accordance with a performance indicator.

5. The system of claim 4, wherein the performance indicator is at least one of a precision indicator, a recall indicator, or a function of the precision indicator and the recall indicator.

6. The system of claim 1, wherein the one or more processors, to extract the first quantity of key phrases from the first portion of the transcript, are configured to extract the first quantity of key phrases from the first portion of the transcript using a part-of-speech analysis, and wherein the one or more processors, to extract the second quantity of key phrases from the second portion of the transcript, are configured to extract the second quantity of key phrases from the second portion of the transcript using a part-of-speech analysis.

7. The system of claim 1, wherein the one or more processors are further configured to:

generate a first set of clusters in accordance with performing a first unsupervised clustering based on a similarity between a plurality of key phrases associated with the utterances by the user to the entity and based on a similarity between the plurality of key phrases associated with the utterances by the entity to the user; and generate a second set of clusters in accordance with performing a second unsupervised clustering based on a similarity between the plurality of key phrases associated with the utterances by the user to the entity.

8. The system of claim 7, wherein one or more processors, to assign one or more key phrases of the first quantity of key phrases to one or more topics of the first set of topics, are configured to:

map one or more clusters of the first set of clusters to one or more topics of the first set of topics; and assign a most frequent key phrase or a most relevant key phrase included the first set of clusters as a root key phrase for a topic of the first set of topics; and wherein the one or more processors, to assign one or more key phrases of the second quantity of key phrases to one or more topics of the second set of topics, are configured to:

map one or more clusters of the second set of clusters to one or more topics of the second set of topics; and assign a most frequent key phrase or a most relevant key phrase included the second set of clusters as a root key phrase for a topic of the second set of topics.

9. The system of claim 1, wherein the one or more processors are further configured to extract, from the transcript, all key phrases associated with a plurality of topics, wherein the one or more processors, to assign a key phrase of the first quantity of key phrases to a topic of the first set of topics, are configured to assign the key phrase of the first quantity of key phrases to the topic of the first set of topics in accordance with at least one of a root word associated with the key phrase of the first quantity of key phrases and a root word associated with the topic of the first set of topics, and wherein the one or more processors, to assign a key phrase of the second quantity of key phrases to a topic of the second set of topics, are configured to assign the key phrase of the second quantity of key phrases to the topic of the second set of topics in accordance with at least one of a root word associated with the key phrase of the second quantity of key phrases and a root word associated with the topic of the second set of topics.

10. A method of key phrase topic assignment, comprising:

obtaining a transcript that includes utterances between a user and an entity;

extracting a first quantity of key phrases from the transcript;

extracting a second quantity of key phrases from a portion of the transcript, the portion of the transcript including a subset of the utterances included in the transcript;

assigning one or more key phrases of the first quantity of key phrases to one or more topics of a first set of topics;

calculating, for each topic of the first set of topics, a topic frequency that indicates a total quantity of key phrases associated with the topic;

assigning one or more key phrases of the second quantity of key phrases to one or more topics of a second set of topics;

calculating, for each topic of the second set of topics, a topic frequency that indicates a total quantity of key phrases associated with the topic;

generating a third set of topics that includes one or more topics of the first set of topics having a topic frequency that satisfies a first topic frequency threshold and that includes one or more topics of the second set of topics having a topic frequency that satisfies a second topic frequency threshold; and storing only the third set of topics and associated key phrases and transcripts.

11. The method of claim 10, wherein the transcript includes utterances by the user to the entity and utterances by the entity to the user, and wherein the portion of the transcript includes utterances by the user to the entity and does not include utterances by the entity to the user.

12. The method of claim 10, wherein the first quantity of key phrases corresponds to a top quantity of key phrases included in the transcript, and the second quantity of key phrases corresponds to a top quantity of key phrases included in the portion of the transcript.

13. The method of claim 10,
wherein generating the third set of topics comprises generating the third set of topics in accordance with a plurality of parameters, the plurality of parameters including:
    a first parameter that indicates a value associated with the first quantity of key phrases to be extracted from the transcript;
    a second parameter that indicates a value associated with the second quantity of key phrases to be extracted from the portion of the transcript;
    a third parameter that indicates the first topic frequency threshold; and
    a fourth parameter that indicates the second topic frequency threshold.

14. The method of claim 13, further comprising adjusting at least one of the first parameter, the second parameter, the third parameter, or the fourth parameter in accordance with a performance indicator.

15. The method of claim 14,
wherein the performance indicator is at least one of a precision indicator, a recall indicator, or a function of the precision indicator and the recall indicator.

16. A non-transitory computer-readable medium storing a set of instructions, the set of instructions comprising:
    one or more instructions that, when executed by one or more processors of a device, cause the device to:
        obtain a transcript that includes interactions between a user and an entity;
        extract a first quantity of key phrases from a first portion of the transcript that includes utterances by the user to the entity and utterances by the entity to the user;
        extract a second quantity of key phrases from a second portion of the transcript that includes utterances by the user to the entity;
        assign one or more key phrases of the first quantity of key phrases to one or more topics of a set of topics;
        calculate, for each topic of the set of topics, a topic frequency that indicates a total quantity of key phrases associated with the topic;
        assign one or more key phrases of the second quantity of key phrases to one or more topics of a second set of topics;

calculate, for each topic of the second set of topics, a topic frequency that indicates a total quantity of key phrases associated with the topic;
    generate a third set of topics that includes one or more topics of the first set of topics having a topic frequency that satisfies a first topic frequency threshold and that includes one or more topics of the second set of topics having a topic frequency that satisfies a second topic frequency threshold; and
    store only the third set of topics and associated key phrases and transcripts.

17. The non-transitory computer-readable medium of claim 16,
wherein the first quantity of key phrases corresponds to a top quantity of key phrases included in the first portion of the transcript.

18. The non-transitory computer-readable medium of claim 16,
wherein the one or more instructions, when executed by the one or more processors of the device, that cause the device to generate the third set of topics, cause the device to generate the third set of topics in accordance with a plurality of parameters, the plurality of parameters including:
    a first parameter that indicates a value associated with the first quantity of key phrases to be extracted from the first portion of the transcript; and
    a second parameter that indicates the first topic frequency threshold.

19. The non-transitory computer-readable medium of claim 18,
wherein the one or more instructions, when executed by the one or more processors of the device, further cause the device to adjust at least one of the first parameter or the second parameter in accordance with a performance indicator.

20. The non-transitory computer-readable medium of claim 19,
wherein the performance indicator is at least one of a precision indicator, a recall indicator, or a function of the precision indicator and the recall indicator.

* * * * *